No. 754,848. PATENTED MAR. 15, 1904.
S. C. CLARK.
AUTOMATIC STOCK WATERING MACHINE.
APPLICATION FILED JUNE 11, 1903.
NO MODEL. 3 SHEETS—SHEET 1.
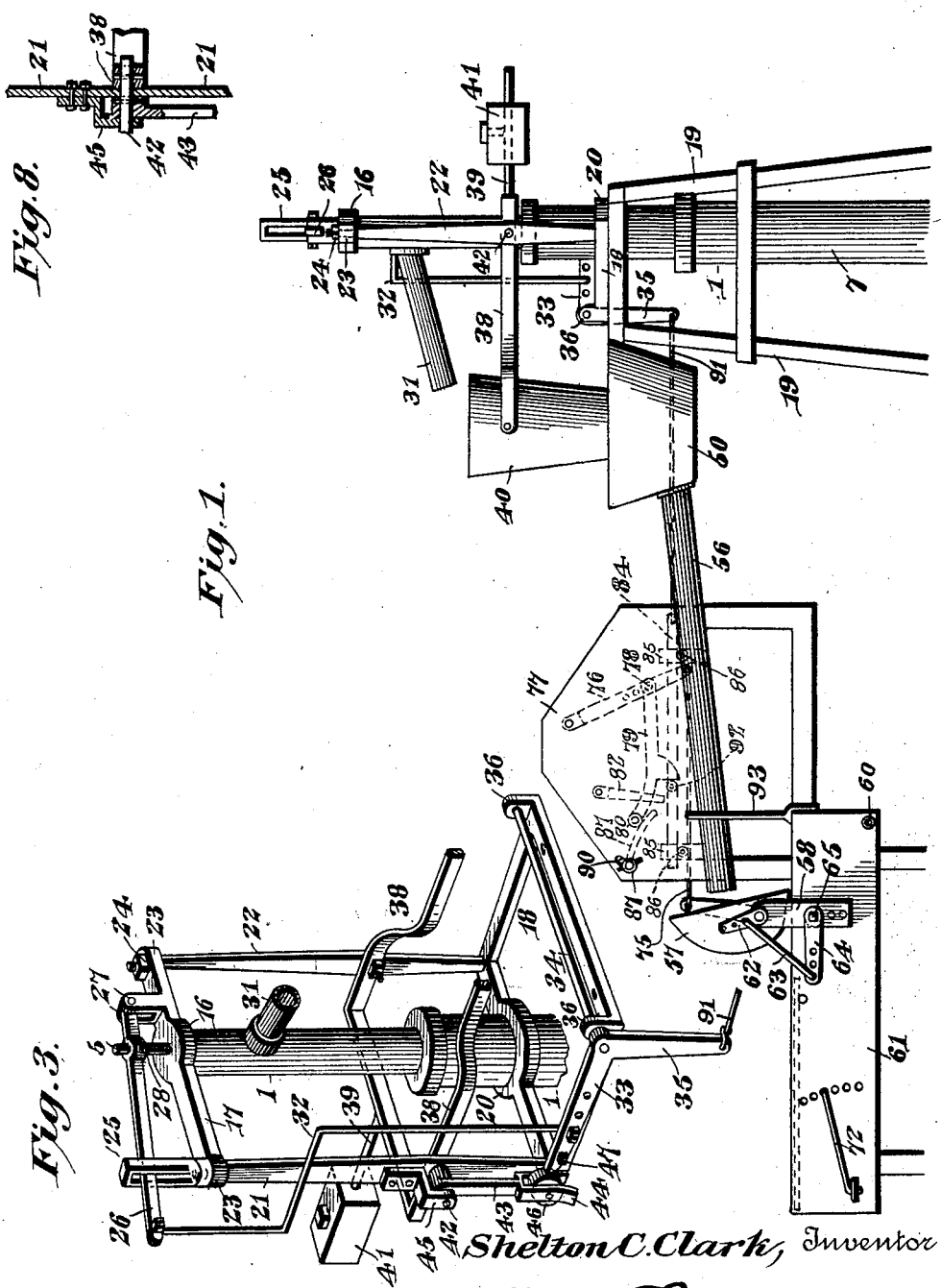
Shelton C. Clark, Inventor
Witnesses No. 754,848. PATENTED MAR. 15, 1904.
S. C. CLARK.
AUTOMATIC STOCK WATERING MACHINE.
APPLICATION FILED JUNE 11, 1903.
NO MODEL. 3 SHEETS—SHEET 2.
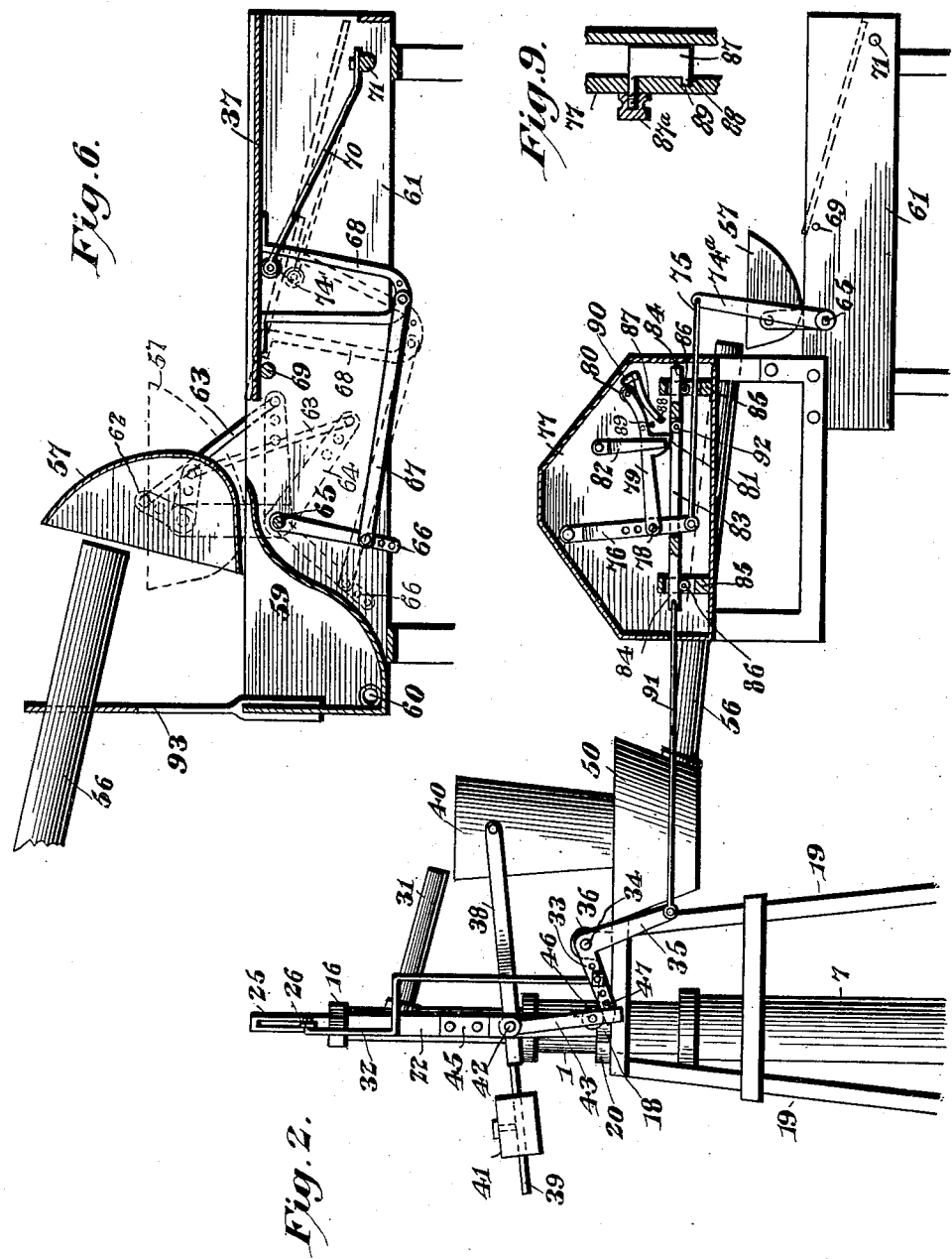
Shelton C. Clark, Inventor
Witnesses
Jas. F. McCathran
H. F. Riley
By
C. G. Siggers
Attorney

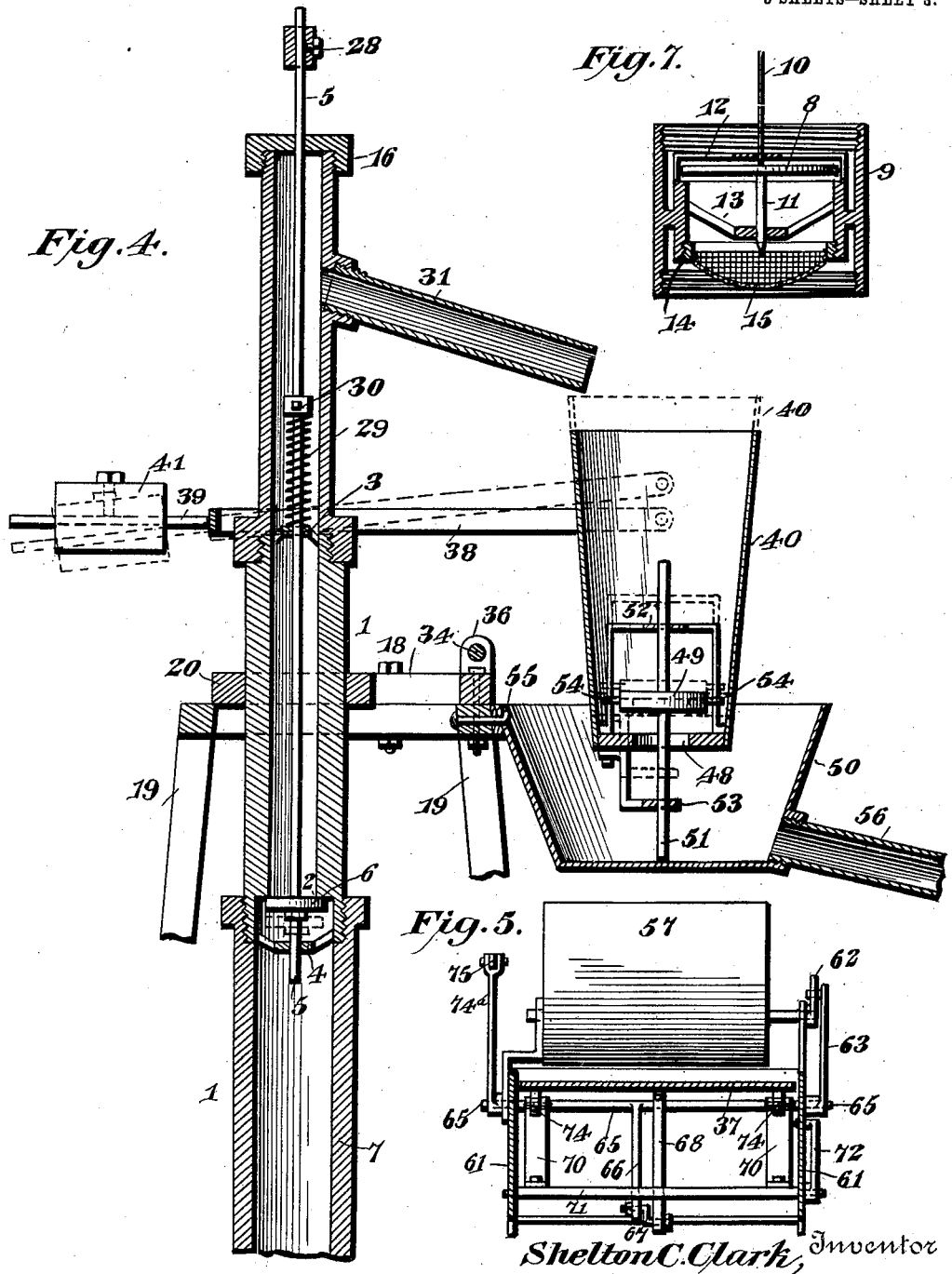

No. 754,848. Patented March 15, 1904.

UNITED STATES PATENT OFFICE.

SHELTON C. CLARK, OF BEATRICE, NEBRASKA, ASSIGNOR OF ONE-HALF TO J. F. LEWIS AND A. R. LEWIS, OF BEATRICE, NEBRASKA.

AUTOMATIC STOCK-WATERING MACHINE.

SPECIFICATION forming part of Letters Patent No. 754,848, dated March 15, 1904.

Application filed June 11, 1903. Serial No. 161,089. (No model.)

*To all whom it may concern:*

Be it known that I, SHELTON C. CLARK, a citizen of the United States, residing at Beatrice, in the county of Gage and State of Nebraska, have invented a new and useful Automatic Stock-Watering Machine, of which the following is a specification.

The invention relates to an automatic stock-watering machine.

The object of the present invention is to improve the construction of stock-watering machines and to provide a simple and comparatively inexpensive apparatus adapted to be operated by an animal and capable of automatically drawing a quantity of water and of delivering the same to the animal.

A further object of the invention is to provide an apparatus of this character in which the watering-trough will be automatically emptied after an animal is through drinking, whereby the apparatus is prevented from becoming frozen and inoperative in cold weather.

With these and other objects in view the invention consists in the construction and novel combination and arrangement of parts hereinafter fully described, illustrated in the accompanying drawings, and pointed out in the claims hereto appended, it being understood that various changes in the form, proportion, size, and minor details of construction within the scope of the claims may be resorted to without departing from the spirit or sacrificing any of the advantages of the invention.

In the drawings, Figure 1 is a side elevation of a stock-watering apparatus constructed in accordance with this invention. Fig. 2 is a similar view, partly in section, of the opposite side of the apparatus. Fig. 3 is a perspective view of the valve-casing and the valve-actuating mechanism. Fig. 4 is a vertical sectional view illustrating the construction of the valve mechanism and the valved bucket. Fig. 5 is a transverse sectional view illustrating the manner of mounting the drinking-trough. Fig. 6 is a longitudinal sectional view of the same. Fig. 7 is a detail view of the check-valve. Fig. 8 is an enlarged detail sectional view of one side of the oscillatory bucket-carrying frame, illustrating the manner of connecting the depending arm with the same. Fig. 9 is an enlarged sectional view illustrating the manner of mounting the adjustable inclined trip.

Like numerals of reference designate corresponding parts in all the figures of the drawings.

1 designates a vertical pipe or tube composed of sections and forming a valve-casing. One of the sections is provided with a valve-seat 2, and it has suitable guides 3 and 4 for the reception of the vertically-movable valve-stem 5, which carries a valve 6, arranged to close against the seat 2. The valve-seat is at the lower end of the section of the pipe or tubing, and the pressure of the water assists in holding the valve to its seat. The lower section 7, which may be connected with a water-main or any suitable source of supply, is preferably provided with a check-valve, as illustrated in Fig. 7 of the accompanying drawings. The check-valve 8, which is arranged in a suitable section or casing 9, closes against and is located above a suitable seat, and it is adapted to prevent any back pressure. The check-valve is provided with arms or stems 10 and 11, arranged in perforations of braces 12 and 13, which form guides and supports for the check-valve. The section or casing 9 is provided with an interiorly-arranged tubular portion 14, centrally connected with the section or casing and forming an upper valve-seat and having an interiorly-threaded lower end for the reception of a strainer or screen 15 for catching sand and dirt. The braces or guides 12 and 13 are connected with the upper portion of the interior tubular portion 14. The check-valve may be omitted, if desired.

The valve-stem 5 extends through a central opening or perforation of a cap 16, formed integral with a top cross-piece 17 and interiorly threaded to screw on the upper end of the pipe or tube 1; but the screw-threads may be omitted and any other form of connection may be provided. The track or tube 1 is supported by an approximately rectangular frame 18, supported by corner-posts 19, preferably arranged at a slight inclination, as shown in Figs. 1 and 2. The rectangular frame 18 is provided at its rear cross-bar with a collar 20 to receive the vertical pipe or tube 1, and upright bars 21 and 22 are secured at their lower terminals to the rectangular frame 18 and rise therefrom. The upper ends of the bars 21 and 22 are threaded and extend through eyes or perforations 23 of the cross-bar 17. The cross-bar 17 is secured at one end to the upright bar 22 by a nut 24, and the threaded upper end of the other bar 21 receives a guide 25, having a vertical slot or opening and provided at its lower end with a threaded perforation to receive the bar 21.

The guide extends upward from one end of the top cross-bar to receive a lever 26, which is adjustably connected to the upper portion of the valve-stem 5. The top cross-bar 17 is provided with a pair of upwardly-extending ears 27 to receive the inner end of the lever 26, which is fulcrumed on a suitable pivot passing through perforations of the ears 27. The lever is provided adjacent to its pivoted end with a perforation or opening for the valve-stem, and it carries a set-screw 28 for engaging the same. By this adjustment the opening of the valve may be readily controlled. The valve 6 is normally maintained in engagement with its seat by means of a coiled spring 29, disposed on the valve-stem and interposed between the upper guide 3 and a suitable stop 30 of the valve-stem. The stop 30 preferably consists of a collar adjustably secured to the valve-stem by a set-screw. When the lever is swung downward, the valve 6 will be opened and water will be permitted to flow upward through the vertical pipe or tube, which is provided at its upper portion with a discharge pipe or nozzle 31, arranged at an inclination, as shown in Fig. 4.

The outer end of the lever 26 is connected by a rod 32 with an arm 33 of a rock-shaft 34, which is also provided with a depending arm 35, the arms 33 and 35 being located at one end of the shaft 34 and being arranged at approximately right angles to each other and forming a bell-crank lever. The shaft 34 is journaled in suitable bearings 36 of the rectangular frame 18, and it forms a pivot or fulcrum for the bell-crank lever. The arm 35 is connected, by the means hereinafter described, with a depressible platform 37, adapted, as hereinafter explained, to be actuated by the weight of an animal, whereby the bell-crank lever will be oscillated and will swing the lever 26 downward and open the valve.

The valve is retained in its open position until a predetermined quantity of water is obtained by means of an oscillatory weighted bucket-supporting frame 38, consisting of an approximately U-shaped body portion and a rearwardly-extending stem 39. The U-shaped body portion is pivoted at opposite sides to the upright bars 21 and 22, and a bucket 40 is pivoted between the sides of the body portion of the weighted frame at the front end thereof. The bucket is located beneath the spout or discharge 31 in position to receive water flowing therefrom, and the rod 39 receives an adjustable weight 41, which overbalances the bucket and which is adapted to swing the same upward when the oscillatory bucket-receiving frame is free to move and the bucket is empty. The pivot 42, which extends through the bar 21 and which supports the adjacent sides of the oscillatory bucket-carrying frame, has rigidly connected to it a depending arm 43, located on the exterior of the bar 21 and having a lower bifurcated end 44, arranged in the path of the arm 33 of the bell-crank lever. The pivots of the bucket-carrying frame are supported by suitable braces 45, and the bifurcated end 44 receives a roller 46, which normally engages the outer or rear end of the arm 33. When the platform is depressed by the weight of an animal, the arm 33 is swung downward, as hereinafter explained, thereby swinging the lever 26 downward and opening the valve. As soon as the arm 33 moves downward to a point below the engaging member or roller of the arm 43 the latter swings forward and the roller lies directly above the rear end of the arm 33 and prevents the valve from closing. The roller provides a frictionless engaging element for the arm 43; but any other suitable means may be provided for this purpose. The arm 43 is swung forward by the weight 41, and its forward movement is limited by a projection 47, extending from the exterior of the arm 33. The weight 41 overbalances the bucket, and as soon as the arm 33 is moved downward and the frame 38 is free to move the said weight lifts the bucket and maintains the same in an elevated position until sufficient water flows into the bucket and overbalances the weight. The downward movement of the bucket swings the arm 43 rearward, and the spring, which is connected with the valve stem or rod, closes the valve and raises the arm 33 to a position in front of the roller 46.

The bucket is provided at its bottom with an opening 48, which is covered by a valve 49 when the bucket is elevated and which automatically uncovers the opening when the bucket descends to permit the water to flow into a tank or receptacle 50. The valve 49 is provided with a stem 51, extending upward and downward from the valve and supported by upper and lower guides 52 and 53. The upper guide is approximately inverted U-shaped and is provided with straight sides which receive eyes 54 of the valves. The straight sides are connected by a top piece which is provided with a central perforation or guide-opening for the upper portion of the valve-stem. The lower guide 53 is provided with a depending L-shaped arm which is provided with an opening to receive the lower portion of the valve-stem. When the bucket descends, the lower end of the valve-stem strikes the bottom of the tank or receptacle, and thereby opens the valve, which remains in an open position until the bucket is again lifted by the action of the weight 41.

The receptacle 50 is connected with the supporting-frame formed by the posts 19 and their connections by a hook 55, which enables the parts to be readily connected; but any other suitable means may be employed for this purpose. The tank or receptacle 50 may be of any desired construction, and it is connected with an inclined pipe or conduit 56, adapted to convey the water from the bucket to a watering-trough 57. The watering-trough, which is approximately semicircular or semi-oval in cross-section, is pivotally mounted between a pair of upwardly-projecting bearing-arms or brackets 58, and it is normally maintained in a partially-inverted position, as illustrated in full lines in Fig. 1 of the accompanying drawings, to enable the water to drain from it after use, to prevent ice from collecting in it in cold weather, and also to insure a fresh supply for each animal. The watering-trough empties into a tank 59 and escapes therefrom to a suitable discharge-pipe 60. The tank is located within a frame 61 at the inner end thereof, and the platform 37 is mounted between the outer portion of the frame.

One of the pivots of the drinking-trough is provided with an upwardly-extending arm 62, provided with a series of perforations, and is adjustably connected to an inclined rod 63, which has its lower arm adjustably connected to an arm 64 of a transverse rock-shaft 65. The arm 64 is provided with a series of perforations, and the rod 63 is capable of adjustment to secure the proper movement of the watering-trough. The transverse rock-shaft is provided with a central depending arm 66 and is connected by a rod 67 with a depending approximately U-shaped arm 68 of the platform, which is hinged at its inner end by a shaft or pintle 69. The platform, which in practice is designed to be located approximately level with the surface of the ground to facilitate its operation by an animal, is maintained normally in an elevated position by a pair of springs 70, secured at their outer ends to a shaft 71 and having their inner ends engaging the depressible platform. The shaft 71, which is journaled in suitable bearings of the platform-receiving frame, is provided at one end with an arm 72, adapted to be adjusted to vary the tension of the springs, and the said arm may be secured in its adjustment in any suitable manner. In the accompanying drawings the arm 72 is shown as resilient, and the adjacent side of the platform-frame is provided with a curved series of perforations adapted to be engaged by the arm 72, which has its outer end bent inward to provide an engaging portion. In order to enable the platform to move freely and frictionlessly, antifriction-rollers 74 are provided, and these rollers may be mounted either upon the lower face of the platform or upon the upper end of the springs, as will be readily understood. When the rollers are mounted upon the lower face of the platform, the springs will be shaped to receive the rollers and slide thereon. The platform-receiving frame is designed in practice to be set into the ground and to be supported upon posts or stakes driven into the ground to provide a firm foundation or base.

When the platform is depressed, the transverse rock-shaft 65 is rotated and the arm 64 is oscillated to swing the drinking-trough downward from the position shown in full lines in Fig. 1 to that illustrated in Fig. 2 to arrange it for receiving the water. This movement of the transverse rock-shaft also operates to oscillate an arm $74^a$, located at the side opposite that at which the arm 64 is located and connected by a rod 75 with a lever 76, located within a casing 77 and fulcrumed at its upper end on the same. The lever 76 is arranged in upright position and is connected at its lower end to the said rod 75 and is provided between its ends with a series of perforations to receive a pivot 78 for adjustably connecting a trip-dog 79 to it. The trip-dog 79, which is arranged approximately in a horizontal position, is pivoted at its rear end to the lever 76 and is provided at its front end, which is bifurcated, with an antifriction-roller 80. The trip-dog is provided between its ends with a depending lug or tube 81 and is guided by a keeper 82, secured to the casing and having a depending approximately L-shaped guiding portion. The lug or tube 81, which depends from the trip-dog, extends into a slot or opening 83 of a reciprocating rod or bar 84, which is mounted in suitable guides 85 and which is completely housed within the said casing 77. The guides 85 consist of posts having slots or openings to receive the bar 84 and provided with antifriction-rollers 86, mounted in the slots or openings and located beneath and supporting the bar 84. The front end of the trip-dog is supported upon an inclined trip 87, whereby when the dog is moved rearward, it will actuate the reciprocating bar during a portion of its movement and will be automatically lifted out of such engagement by the inclined trip to permit the reciprocating bar to return to its initial position before the depressible platform and to permit the valve to close as soon as the bucket receives sufficient water to oscillate the frame 38 and carry the depending arm 43 out of engagement with the arm 33 of the bell-crank lever. The inclined trip 87 is adjustable, being secured at its upper end by a set-screw $87^a$ and provided at its lower end with engaging portions 88, adapted to interlock with any one of a series of notches 89 of the casing. The set-screw operates in a slot 90 of the casing and has its head arranged on the exterior thereof. The rear end of the reciprocating rod 84 is connected by a wire 91 or other suitable means with the depending arm 35 of the bell-crank lever. An antifriction-roller 92 is mounted in the slot or opening of the rod 84 to enable the lug or tooth of the trip-dog to readily disengage itself from the bar 84.

When the platform is depressed by the weight of an animal, the pivoted drinking-trough is swung downward to an upright position to receive the water and the valve is opened and locked in such position before the reciprocating bar is released by the trip mechanism. As soon as the bucket receives a sufficient amount of water to overbalance the weight 41 it will oscillate the frame 38, thereby releasing the valve 6 and opening the valve 49. This shuts off the flow of water from the discharge pipe or tube 31 and permits the water from the bucket to flow through the pipe 56 to the trough. As soon as the animal steps from the depressible platform the latter is raised by the springs, which invert the trough and empty the water therefrom.

The lower end of the pipe 56 is supported by an arm 93, having a lower forked or bifurcated terminal to straddle the inner end piece of the platform-receiving frame and provided with an opening at its upper end to receive the pipe or conduit 56. The depending arm 66 of the transverse rock-shaft 65 is provided with a series of perforations to receive the pintle of the connecting rod or bar 67, whereby the parts are adapted to be adjusted to permit the platform and the watering-trough to be positioned properly with relation to each other.

Having thus fully described my invention, what I claim as new, and desire to secure by Letters Patent, is—

1. In an apparatus of the class described, the combination with a supply-pipe having a valve, of operating mechanism connected with the valve for opening the same, and an oscillatory bucket-carrying frame movable independently of the valve and provided with a bucket to receive the water and arranged to hold the valve open and to release the same, substantially as described.

2. In an apparatus of the class described, the combination with a supply-pipe having a valve, of operating mechanism connected with the valve for opening the same and provided with a trip for automatically releasing the same, a movable bucket arranged to receive the water, and means movable independently of the valve for locking the valve in its open position until the bucket receives its supply and for releasing the same to permit the same to close after the bucket has received its supply, substantially as described.

3. In an apparatus of the class described, the combination with a source of supply having an automatically-closing valve, of operating mechanism connected with the valve for opening the same, said operating mechanism being provided with a trip for automatically releasing the valve, and means movable independently of the valve for locking the valve in an open position until a predetermined quantity of water has been obtained, substantially as described.

4. In an apparatus of the class described, the combination with a pipe having a valve, of operating mechanism connected with the valve for opening the same and provided with a trip for automatically releasing the valve, and a weighted oscillatory frame movable independently of the valve and provided with a bucket and arranged to hold the valve in an open position until the bucket has received a supply of water, said frame being movable to release the valve when the bucket has received its supply, substantially as described.

5. In an apparatus of the class described, the combination with a supply-pipe having a valve, of operating mechanism connected with the valve for opening the same and provided with a trip for automatically releasing the valve, and an oscillatory frame movable independently of the valve and pivoted between its ends and provided at one side of the pivotal point with a weight and having a bucket at the opposite side, said frame being arranged to lock the valve in its open position until the bucket has received its supply, substantially as described.

6. In an apparatus of the class described, the combination with a supply-pipe having a valve, of a lever connected with the valve, a movable device connected with the lever, means for operating the movable device to open the valve, and a weighted oscillatory bucket-carrying frame movable independently of the valve and provided with a bucket and arranged to engage the said movable device for locking the valve open while the bucket is receiving its supply, substantially as described.

7. In an apparatus of the class described, the combination with a supply-pipe having a valve, of a movable device connected with the valve for opening the same, operating mechanism for actuating the movable device, and an oscillatory bucket-carrying frame provided with a bucket and arranged to engage the movable device for holding the valve open while the bucket is receiving its supply, substantially as described.

8. In an apparatus of the class described, the combination with a supply-pipe having a valve, of a movable device connected with the valve, operating mechanism for actuating the movable device, and an oscillatory bucket-carrying frame movable independently of the valve and provided with a movable member arranged to engage and release the said movable device, substantially as described.

9. In an apparatus of the class described, the combination with a supply-pipe provided with a valve, of a movable device connected with the valve, operating mechanism for actuating the movable device, a weighted oscillatory frame movable independently of the valve and provided with a member arranged to engage and release the removable device, and a bucket carried by the frame, substantially as described.

10. In an apparatus of the class described, the combination with a supply-pipe having a valve, of a movable device connected with the valve, means for actuating the movable device for opening the valve, a weighted oscillatory frame movable independently of the valve and provided with an arm arranged to engage the movable device, and a bucket carried by the oscillatory frame and adapted when filled to move the same in the opposite direction to the weight, substantially as described.

11. In an apparatus of the class described, the combination with a supply-pipe, of a movable device connected with the valve for opening the same, operating mechanism for actuating the movable device, an oscillatory frame movable independently of the valve and pivoted between its ends and provided at one end with a weight, said frame being provided at its other end with a bucket, and means carried by the movable frame to engage and release the movable device, substantially as described.

12. In an apparatus of the class described, the combination with a supply-pipe, of a movable device connected with the valve for opening the same, means for actuating the movable device for opening the valve, a movable bucket, and means movable independently of the valve for holding the valve open and for releasing the valve when the bucket receives its supply, substantially as described.

13. In an apparatus of the class described, the combination with a supply-pipe having a valve, of means for opening the valve, a movable bucket arranged to receive the water from the supply-pipe, and a weighted bucket-carrying frame movable independently of the valve and movable in one direction by its weight to lock the valve open and in the opposite direction by the bucket to release the valve, substantially as described.

14. In an apparatus of the class described, the combination with a supply-pipe having a valve, of operating mechanism for opening the valve, means for tripping the valve from the operating mechanism, and means movable independently of the valve for locking and releasing the valve, whereby the same will be maintained in an open position until a predetermined quantity of water is obtained, substantially as described.

15. In an apparatus of the class described, the combination of a supply-pipe having a valve, operating mechanism for opening the valve, means for automatically closing the valve, and means movable independently of the valve for locking the valve in an open position and for releasing the same after a predetermined quantity of water has been obtained, substantially as described.

16. In an apparatus of the class described, the combination of a supply-pipe having a valve, operating mechanism for opening the valve, means for tripping the valve from the operating mechanism, means movable independently of the valve for locking the valve in an open position and for releasing the same after a predetermined quantity of water has been obtained, and means for automatically closing the valve, substantially as described.

17. In an apparatus of the class described, the combination of a supply-pipe having a valve, operating mechanism for opening the valve, and means movable independently of the valve for locking the valve in an open position and for releasing the same after a predetermined quantity of water has been obtained, substantially as described.

18. In an apparatus of the class described, the combination of an upright supply-pipe provided with a valve and having a nozzle, an approximately horizontal bucket-carrying frame movable independently of the valve and fulcrumed at opposite sides of the supply-pipe and provided at the back with a weight, a bucket mounted at the front of the frame and arranged to receive water from the said nozzle, an oscillatory arm connected with the bucket-carrying frame, a movable member connected with the valve and arranged in the path of the said arm, and means for operating the movable device, substantially as described.

19. In an apparatus of the class described, the combination with an upright supply-pipe having a valve and provided with a nozzle, upright bars located at opposite sides of the supply-pipe, a top cross-piece forming a cap for the supply-pipe and connecting the bars, a guide extending upward from the cross-bar at one end thereof, a lever fulcrumed on the cross-bar and connected with the valve and arranged in the guide, an oscillatory arm connected with the lever, operating mechanism for actuating the arm, and a weighted bucket-carrying frame movable independently of the valve and having a bucket and provided with a movable member arranged to engage the arm, substantially as described.

20. In an apparatus of the class described, the combination of a supply-pipe having a valve, a weighted bucket-carrying frame provided with a bucket, an arm connected with the valve and provided with a lug, a weighted oscillatory frame provided with a bucket, and a depending arm connected with the said frame and having a forked or bifurcated portion and provided with an antifriction device mounted therein and arranged to be engaged by the said arm, substantially as described.

21. In an apparatus of the class described, the combination of a supply-pipe having a valve, a bell-crank lever connected with the valve for opening the same, an oscillatory bucket-carrying frame movable independently of the valve and arranged to engage and release the bell-crank lever, a depressible platform connected with the bell-crank lever, and means for tripping the same, substantially as described.

22. In an apparatus of the class described, the combination of a supply-pipe having a valve, a depressible platform, means for connecting the platform with the valve for opening the same, a movable drinking-trough, means for conducting the water to the drinking-trough, and means operable by the platform for moving the drinking-trough to arrange the same in position to receive water and to empty the water therefrom, substantially as described.

23. In an apparatus of the class described, the combination of a supply-pipe having a valve, a depressible platform connected with the valve for opening the same, a movable drinking-trough arranged to receive the water from the supply-pipe, and means operable by the platform for emptying the trough when the pressure is removed from the said platform, substantially as described.

24. In an apparatus of the class described, the combination of a movable drinking-trough, means for supplying water to the same, a depressible platform, and means operable by the platform for emptying the water from the trough when the pressure is removed from the said platform, substantially as described.

25. In an apparatus of the class described, the combination of a movable drinking-trough, means for supplying water to the same, a depressible platfrom, and means operated by the platform for arranging the drinking-trough to receive water when the platform is depressed and for inverting the drinking-trough to empty the same when the pressure is removed, substantially as described.

26. In an apparatus of the class described, the combination of a pivotally-mounted drinking-trough, means for supplying water to the same, and means for automatically tilting the trough to arrange it to receive the water and also to empty the water, substantially as described.

27. In an apparatus of the class described, the combination of a pivotally-mounted drinking-trough, means for supplying water to the same, a depressible platform, and means operable by the depressible platform for tilting the trough to arrange it to receive water and also to empty the water, substantially as described.

28. In an apparatus of the class described, the combination of a tilting drinking-trough, a depressible platform connected with and arranged to operate the trough, a supply-pipe provided with a nozzle and having a valve, means operable by the platform for opening the valve, an oscillatory bucket-carrying frame provided with a bucket, and a pipe or conduit arranged to discharge into the drinking-trough and provided with a tank or receptacle to receive the water from the bucket, substantially as described.

29. In an apparatus of the class described, the combination of a supply-pipe provided with a valve and having a nozzle, a movable bucket arranged to receive the water from the nozzle and provided at the bottom with a valve having a depending stem, a drinking-trough, and a pipe or conduit emptying into the drinking-trough and having a receptacle at its upper end arranged in the path of the bucket and adapted to be engaged by the valve-stem for opening the valve, substantially as described.

30. In an apparatus of the class described, the combination with a supply-pipe having a valve, operating mechanism connected with the valve for opening the same, a weighted oscillatory frame movable independently of the valve and provided with means for holding the valve in its open position and for releasing the same, and a bucket carried by the frame and provided with an automatically-opening valve, substantially as described.

31. In an apparatus of the class described, the combination of a supply-pipe having a valve, means for operating the valve for opening the same, a weighted oscillatory frame movable independently of the valve and provided with means for holding the valve in its open position, said frame being movable in one direction by its weight, and a bucket carried by the frame and adapted when filled to move the same in the opposite direction, said bucket being provided with an automatically-opening valve, substantially as described.

32. In an apparatus of the class described, the combination of a pivotally-mounted drinking-trough, a depressible platform connected with the drinking-trough and oscillating the same, a shaft provided with a spring engaging the depressible platform, and means for adjusting the shaft for varying the tension of the spring, substantially as described.

33. In an apparatus of the class described, the combination of a pivoted drinking-trough, a depressible platform connected with and actuating the trough, a shaft having a spring engaging the platform, an arm connected with the shaft, and means for securing the arm in its adjusted position, substantially as described.

34. In an apparatus of the class described, the combination of a pivoted drinking-trough, a transverse shaft having an arm connected with that of the drinking-trough, a depressible platform, arms depending from the platform and the shaft, and means for connecting such depending arms, substantially as described.

35. In an apparatus of the class described, the combination with a supply-pipe having a valve, a reciprocating bar connected with the valve, operating mechanism, a trip-dog connected with the operating mechanism and engaging the reciprocating bar, and means for automatically throwing the trip-dog out of such engagement, substantially as described.

36. In an apparatus of the class described, the combination with a source of supply having a valve, of a reciprocating bar connected with the valve, a trip-dog engaging the bar, an inclined trip arranged in the path of the dog and adapted to disengage the same automatically and a depressible platform connected with the dog, substantially as described.

37. In an apparatus of the class described, the combination with a source of supply having a valve, of a reciprocating bar, a lever, a trip-dog carried by the lever and engaging the bar, means for automatically throwing the trip-dog out of such engagement and a depressible platform connected with the dog, substantially as described.

38. In an apparatus of the class described, the combination with a source of supply having a valve, of a reciprocating bar, a lever, a dog carried by the lever and engaging the bar, an inclined trip arranged in the path of the trip-dog and a depressible platform connected with the latter, substantially as described.

39. In an apparatus of the class described, the combination with a source of supply having a valve, of a reciprocating bar having a slot, an upright lever, a dog carried by the lever and having a tooth or projection extending into the slot, means for automatically tripping the dog and a depressible platform connected with the latter, substantially as described.

40. In an apparatus of the class described, the combination with a source of supply having a valve, of a horizontal reciprocatory bar having a slot, an upright lever extending into the slot, a dog pivoted to the lever and having a projection extending into the slot, an adjustable inclined trip arranged in the path of the dog and a depressible platform connected with the latter, substantially as described.

41. In an apparatus of the class described, the combination of a casing, guides arranged in the casing and provided with antifriction devices, a slotted bar supported by the antifriction devices and provided in its slot with an antifriction device, an upright lever operating in the slot of the bar, a dog pivoted to the lever and provided with a tooth extending into the slot of the bar, said dog being also provided with an antifriction device, and an inclined trip arranged to receive the antifriction device of the dog, substantially as described.

42. In an apparatus of the class described, the combination of a slotted casing having notches, an inclined trip provided at one end with means for engaging the notches, a fastening device operating in the slot, and located at the other end of the trip for securing the same in its adjustment, a reciprocating bar, a dog engaging the bar and arranged to be thrown out of such engagement with the trip, and means for actuating the dog, substantially as described.

In testimony that I claim the foregoing as my own I have hereto affixed my signature in the presence of two witnesses.

SHELTON C. CLARK.

Witnesses:
J. F. BEAVER,
J. F. LEWIS.